United States Patent [19]
Fujie

[11] Patent Number: 5,189,961
[45] Date of Patent: Mar. 2, 1993

[54] SUPERCONDUCTIVE MAGNETICALLY LEVITATED RAILWAY, AND POWER-FEED SYSTEM THEREFOR

[75] Inventor: Junji Fujie, Hino, Japan

[73] Assignee: Railway Technical Research Institute, Japan

[21] Appl. No.: 901,954

[22] Filed: Jun. 22, 1992

[30] Foreign Application Priority Data

Jul. 8, 1991 [JP] Japan .................................. 3-166609

[51] Int. Cl.⁵ .......................................... B60L 13/10
[52] U.S. Cl. .................................... 104/281; 104/282; 104/286
[58] Field of Search ............... 104/281, 282, 286, 292, 104/294, 290; 310/13, 12; 318/135

[56] References Cited

U.S. PATENT DOCUMENTS

| | | | |
|---|---|---|---|
| 3,858,522 | 1/1975 | Maki | 104/282 |
| 3,960,090 | 6/1976 | Maki et al. | 104/292 |
| 4,779,538 | 10/1988 | Fujiwara et al. | 104/282 |
| 4,913,059 | 4/1990 | Fujie | 104/282 |

FOREIGN PATENT DOCUMENTS

| | | | |
|---|---|---|---|
| 0075616 | 7/1978 | Japan | 104/282 |
| 0157205 | 12/1979 | Japan | 104/292 |
| 0136504 | 5/1989 | Japan | 104/281 |

Primary Examiner—Robert J. Oberleitner
Assistant Examiner—Mark T. Le
Attorney, Agent, or Firm—Lorusso & Loud

[57] ABSTRACT

A superconductive magnetically levitated railway is provided with six phases of propulsion-levitation-guidance ground coils arranged on both side walls of a track, and with a pair of superconducting magnets, which are mounted on the vehicle, corresponding to the six phases of the ground coils. The ground coils are a U-phase coil, a negative W-phase coil, a V-phase coil, a negative U-phase coil, a W-phase coil and a negative V-phase coil arranged successively at a 60° pitch along both side walls of the track. As a result, higher harmonics of the magnetic field produced by the propulsion-levitation-guidance ground coils can be reduced. In addition, the number of layers of the ground coils can be reduced one and the number of ground coils can be decreased.

5 Claims, 7 Drawing Sheets

FIG.4(a)
LEVITATION

FIG.4(b)
GUIDANCE

SUPERCONDUCTIVE MAGNETICALLY LEVITATED RAILWAY, AND POWER-FEED SYSTEM THEREFOR

BACKGROUND OF THE INVENTION

This invention relates to a superconductive magnetically levitated railway and a system for feeding power thereto.

An example of the prior art in the technical field to which the present invention appertains is as disclosed in the specification of Japanese Patent Application Laid-Open (KOKAI) No. 1-107603.

The arrangement of ground coils and superconducting magnets in a superconductive magnetically levitated railway according to the prior art will now be described with reference to the drawings.

Figure 1:
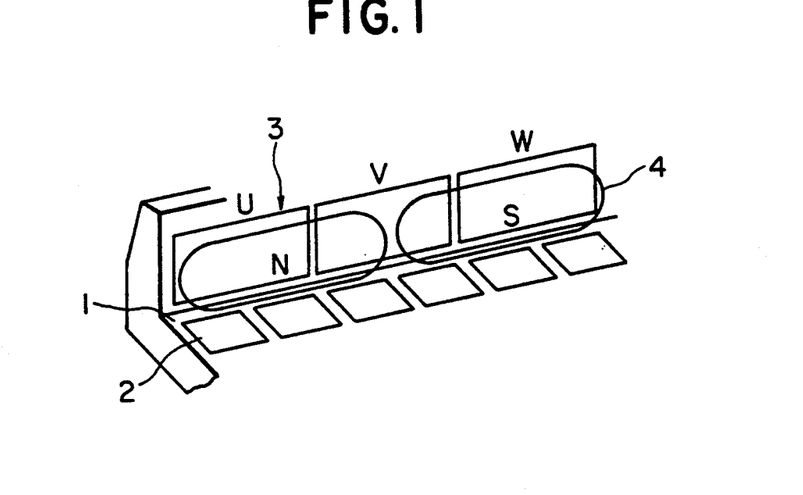
FIG. 1 is a diagram showing the arrangement of ground coils and superconducting magnets of a superconductive magnetically levitated railway according to the prior art.

As for the arrangement of the ground coils in the conventional superconductive magnetically levitated railway, ground coils 2 for levitation are laid upon a track bed 1 having a generally U-shaped cross section, as illustrated in FIG. 1, and ground coils 3 for propulsion and guidance are mounted on the side walls of the track bed 1, at a pitch equivalent to an electric angle of 120°, in such a manner that the three U-, V-and W-phases will correspond to the N and S poles of a superconducting magnet 4 installed on a vehicle. The left-and-right ground coils for propulsion are null-flux connected so as to form a loop and serve also to guide the vehicle. The number of coils per unit length is such that two coils are used for levitation for each single coil that is used for propulsion.

This arrangement of the ground coils according to the prior art has been investigated to determine how the superconducting magnets are affected by the higher harmonics of the magnetic field generated by the propulsion ground coils disposed in this 120° single-layer configuration. As a result of these investigations, it has been found that the vibration of the inner tank of the superconducting magnets becomes large at a specific frequency and that a large amount of heat loss is produced. Accordingly, a two-layer spaced-pole system has been proposed in which, while such measures as strengthening the inner tank of the superconducting magnet are taken, third harmonics are eliminated, without changing the number of coils, as means for reducing higher-harmonic magnetic fields.

Figure 2:
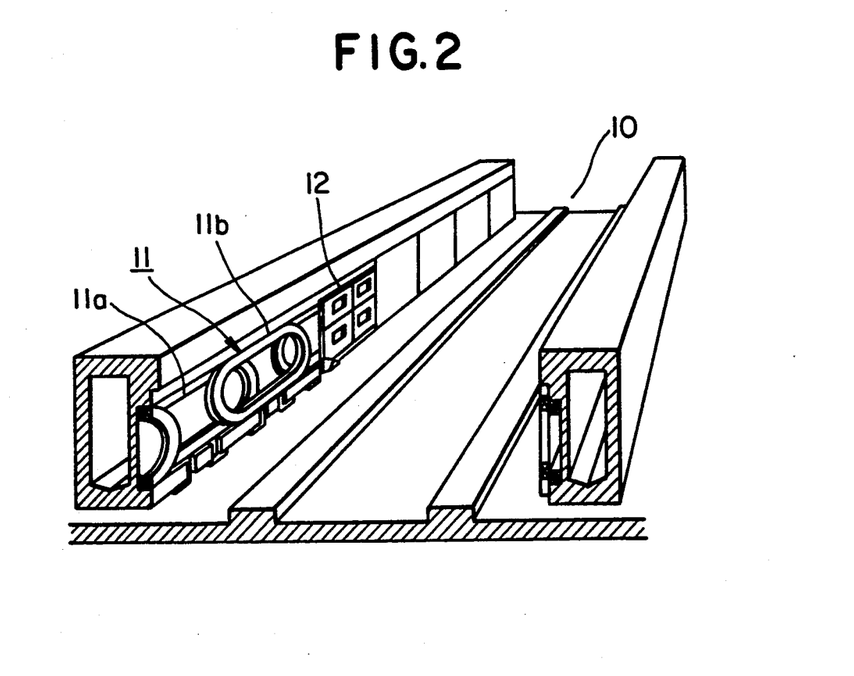
FIG. 2 is a perspective view showing the arrangement of ground coils in another superconductive magnetically levitated railway according to the prior art.

FIG. 2 is a perspective view illustrating the arrangement of the ground coils in the two-layer spaced-pole system mentioned above.

As shown in FIG. 2, a side-wall levitation system is adopted in which ground coils 11 for propulsion and ground coils 12 for levitation and guidance are arranged on the side walls of a track bed 10 having a generally U-shaped cross section.

Figure 3:
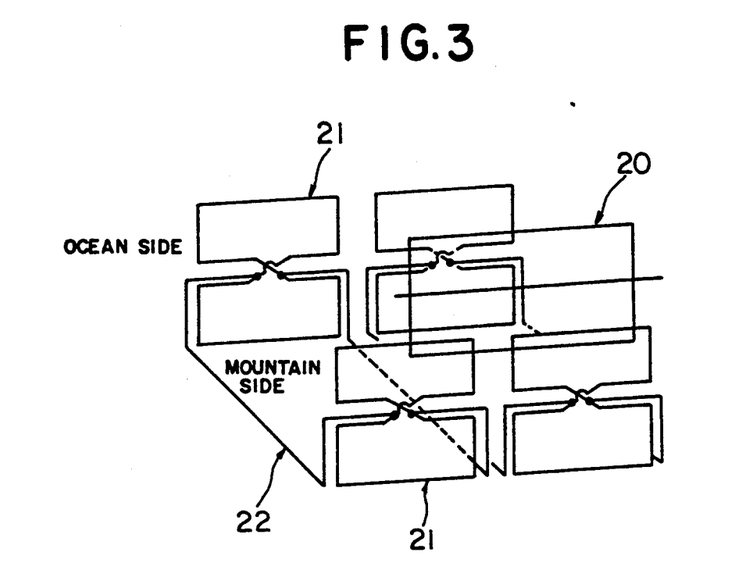
FIG. 3 is a perspective view showing the arrangement of ground coils for levitation and guidance and superconducting magnets of another superconductive magnetically levitated railway according to the prior art.

As shown in FIG. 3, this side-wall levitation system includes ground coils 21 for levitation and guidance and a null-flux line 22. Each levitation-guidance coil 21 has upper and lower coil segments connected together into a figure-eight configuration. The levitation-guidance coils 21 are provided on mountain and ocean sides and are connected together by the null-flux line 22. The levitation-guidance coils 21 are mounted on the side walls of the track bed so that when the center line of a superconducting magnet 20 installed in the vehicle is situated at the center of the levitation-guidance coil 21 having the upper and lower coil segments, the magnetic flux interlinking both coil segments will be the same so that an induced current will not flow through the levitation-guidance coil 21. When the center line of the superconducting magnet 20 installed in the vehicle is situated above or below the center of the levitation-guidance coil 21, an induced current flows through the coil 21 and both the upper and lower coil segments thereof generate a force which returns the superconducting magnet 20 to the center. When the superconducting magnet 20 is below the center, therefore, a levitating force is produced.

Figure 4A:
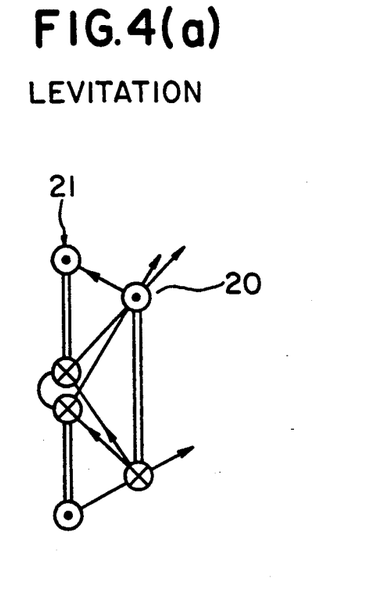
FIG. 4(a) and FIG. 4(b) are diagrams for describing the levitating and guiding actions of another superconductive magnetically levitated railway according to the prior art.

Since a levitating force is produced by each horizontal side of the levitation-guidance coil 21, as shown in FIG. 4($a$), the same levitating force can be obtained by passing less current through the ground coil 21 in comparison with the system of FIG. 1, and therefore the resistive loss that accompanies levitation also is smaller by comparison. Accordingly, the resistance to traveling of the vehicle (namely the magnetic resistance) caused by magnetism is small. In addition, the magnetic resistance which exhibits its peak value at low velocities can be made zero if the vehicle is made to travel on wheels at the time of low velocity while the height of the center line of the superconducting magnet and the height of the center line of the ground coils are made to coincide.

Figure 4B:
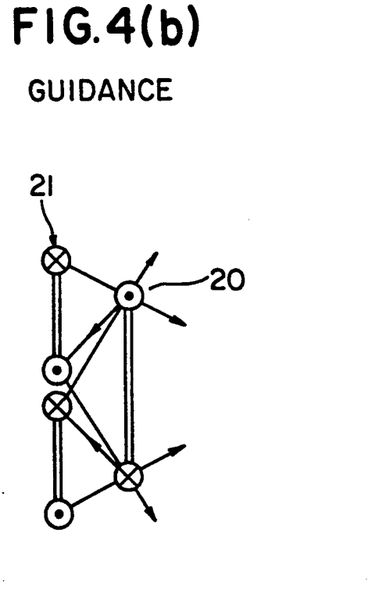

The guiding force is produced as shown in FIG. 4($b$). Specifically, the upper coil segments of the levitating coils on the left and right side walls, as well as the lower coils segments of these levitating coils, are connected by the null-flux line 22 (see FIG. 3) in such a manner that the induced voltages will cancel each other out. As a result, the induced voltage of the levitating coil on the side approached by the superconducting magnet 20 becomes larger than that of the levitating coil on the side from which the superconducting magnet 20 departs, and therefore a circulating current flows through the null-flux line. This causes a repulsive force to be produced on the side approached by the superconducting magnet 20 and an attractive force on the side from which the superconducting magnet 20 departs. Since the upper coil segments and the lower coil segments act in the same manner, a sufficient guiding force is obtained.

In the power-feed system according to the prior art, a current of a frequency commensurate with vehicle velocity and required propulsive force is passed through the propulsion coil of a ground primary-type linear synchronized motor to accelerate and decelerate the vehicle. Furthermore, a dual-feeder system is adopted in which the power supply system is provided in two groups and sections are changed over in succession by feeder section switches as the vehicle advances.

With the ground coil arrangement in the two-layer spaced-pole system, as described above, the mutually adjacent U-, V and W-phase coils of the ground coils 11 for propulsion partially overlap each other in order to eliminate third harmonics without changing the number of coils, as illustrated in FIG. 2. In other words, part of the U-phase coil and part of the V-phase coil are overlapped, part of the V-phase coil and part of the W-phase coil are overlapped, and part of the W-phase coil and part of the V-phase coil are overlapped. The coils are disposed in this manner in successive fashion.

When the coils are arranged in this manner, however, the propulsion ground coils 11 are disposed on the side wall of the U-shaped track bed 10 in such a manner that the V-phase coil 11$b$ is placed upon the U-phase coil 11$a$, by say of example, and the ground coils 12 for levitation and guidance are disposed on the side wall by being placed upon the propulsion ground coils 11. Accordingly, the ground coils are disposed in three layers, as a result of which overall thickness is increased. This means that a corresponding amount of space is required in the direction of width. In addition, a half-length of a propulsion coil, which is referred to as an end coil, is required to be placed at each break in the guideway beam. Thus, difficulties are encountered in the installation and maintenance of the ground coils.

SUMMARY OF THE INVENTION

An object of the present invention is to solve the aforementioned problems and provide a superconductive magnetically levitated railway and a power-feed system therefor, in which higher harmonics of the magnetic field generated by the ground coils for propulsion are decreased, the number of ground coil layers and the number of ground coils are reduced and a highly reliable vehicle operating system capable of smooth vehicle propulsion can be constructed.

In accordance with the present invention, the foregoing object is attained by providing a superconductive magnetically levitated railway comprising six phases of propulsion-levitation-guidance ground coils provided on both side walls of a track, and a pair of superconducting magnets, which are mounted on a vehicle, corresponding to the six phases of the propulsion-levitation-guidance ground coils.

The propulsion-levitation-guidance ground coils are a U-phase coil, a negative W-phase coil, a V-phase coil, a negative U-phase coil, a W-phase coil and a negative V-phase coil arranged successively at a 60° pitch along both side walls of the track.

Further, in accordance with the present invention, the foregoing object is attained by providing a power-feed system for a superconductive magnetically levitated railway, which comprises six phases of propulsion-levitation-guidance ground coils provided on both side walls of a track, a pair of superconducting magnets, which are mounted on a vehicle, corresponding to the six phases of the propulsion-levitation-guidance ground coils, and a triple feeder supplying the propulsion-levitation-guidance ground coils.

The triple feeders have a power supply system divided into three systems, in which the vehicle is driven by feeding current from two of the three systems in succession to coil sections partitioned to a suitable length, and is driven by feeding current from the remaining system as well only when there is a transition from one coil section to another.

Further, current is fed from one of the three systems to the U-, V- and W-phases of the propulsion-levitation-guidance ground coils along one side wall of the track, current is fed from another system to the negative U-, V- and W-phases of the propulsion-levitation-guidance ground coils along the other side wall of the track, and when there is a transition from one coil section to another, current is fed successively from a third system to the U-, V- and W-phases or the negative U-, V- and W-phases of the propulsion-levitation-guidance ground coils along both side walls of the track.

Thus, in accordance with the present invention, the arrangement is such that a superconductive magnetically levitated railway comprises the six phases of propulsion-levitation-guidance ground coils provided on both side walls of the track, and the pair of superconducting magnets, which are mounted on the vehicle, corresponding to the six phases of the propulsion-levitation-guidance ground coils. As a result, higher harmonics of the magnetic field generated by the propulsion-levitation-guidance ground coils can be reduced. In addition, the number of ground coil layers is reduced to one, and the number of ground coils can be reduced as well.

Further, owing to the arrangement having the triple feeders for supplying the above-mentioned propulsion-levitation-guidance ground coils, the installed capacity of power converting equipment can be made three-fourths of that in the arrangement which relies upon dual feeders.

Accordingly, even if one system should happen to fail, the vehicle can be driven by the remaining two systems. Though the maximum propulsion will be halved during this interval of time, a vehicle such as a train can continue to be run without the entire line coming to a stop.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the drawings.

Figure 5:
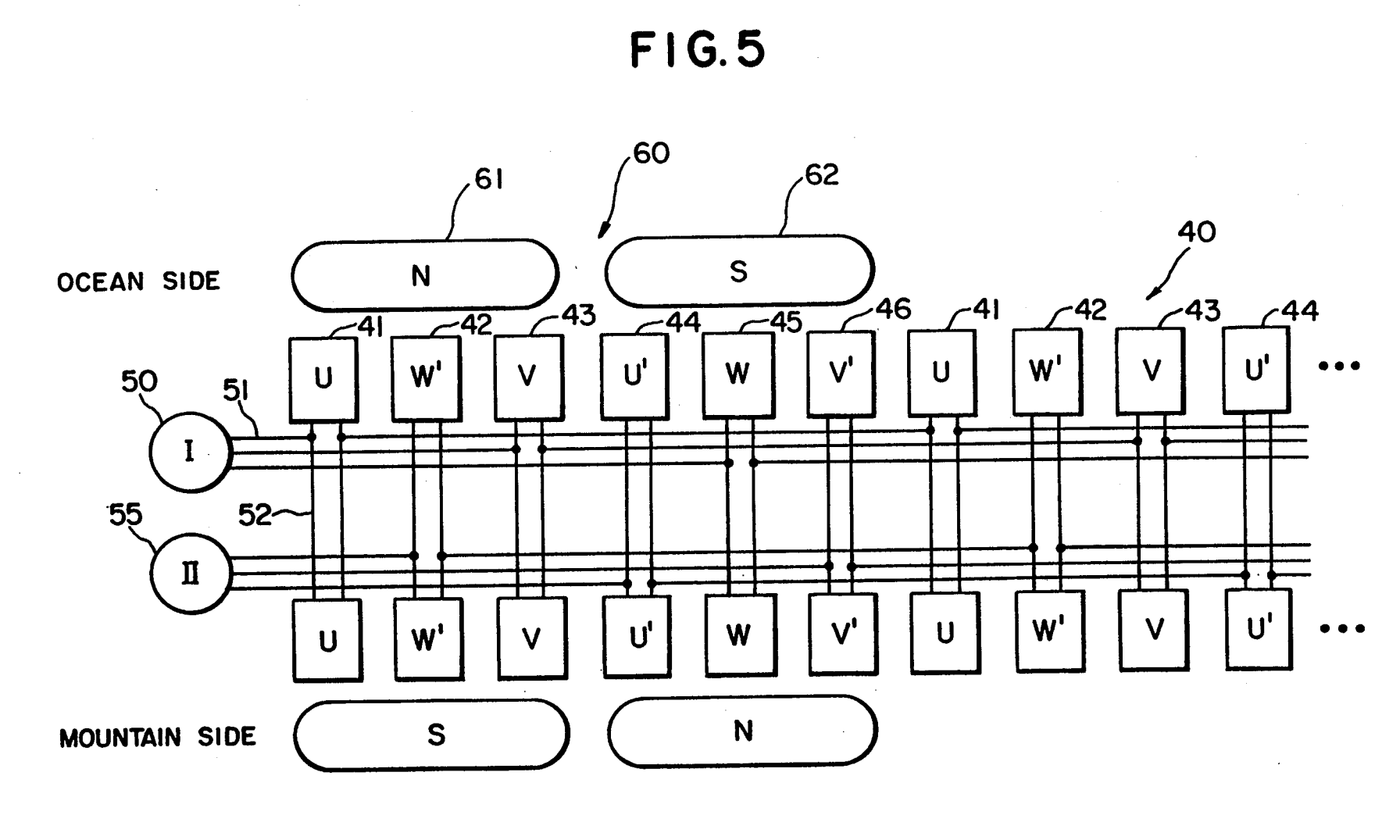
FIG. 5 is a diagram showing the arrangement of ground coils and superconducting magnets of a superconductive magnetically levitated railway illustrating an embodiment of the present invention.
Figure 6:
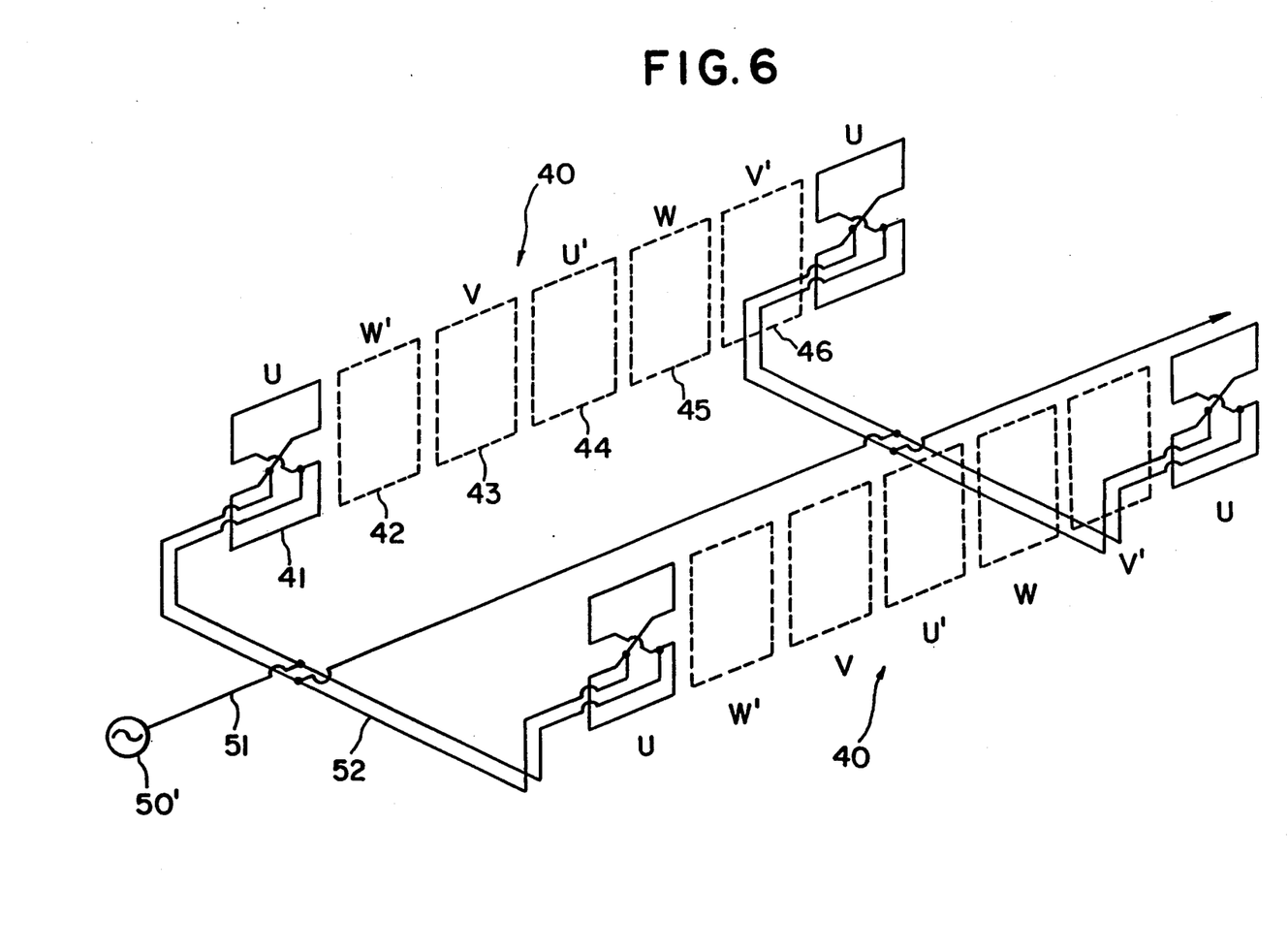
FIG. 6 is a circuit diagram showing the arrangement of ground coils of a superconductive magnetically levitated railway illustrating the embodiment of the present invention.
Figure 7:
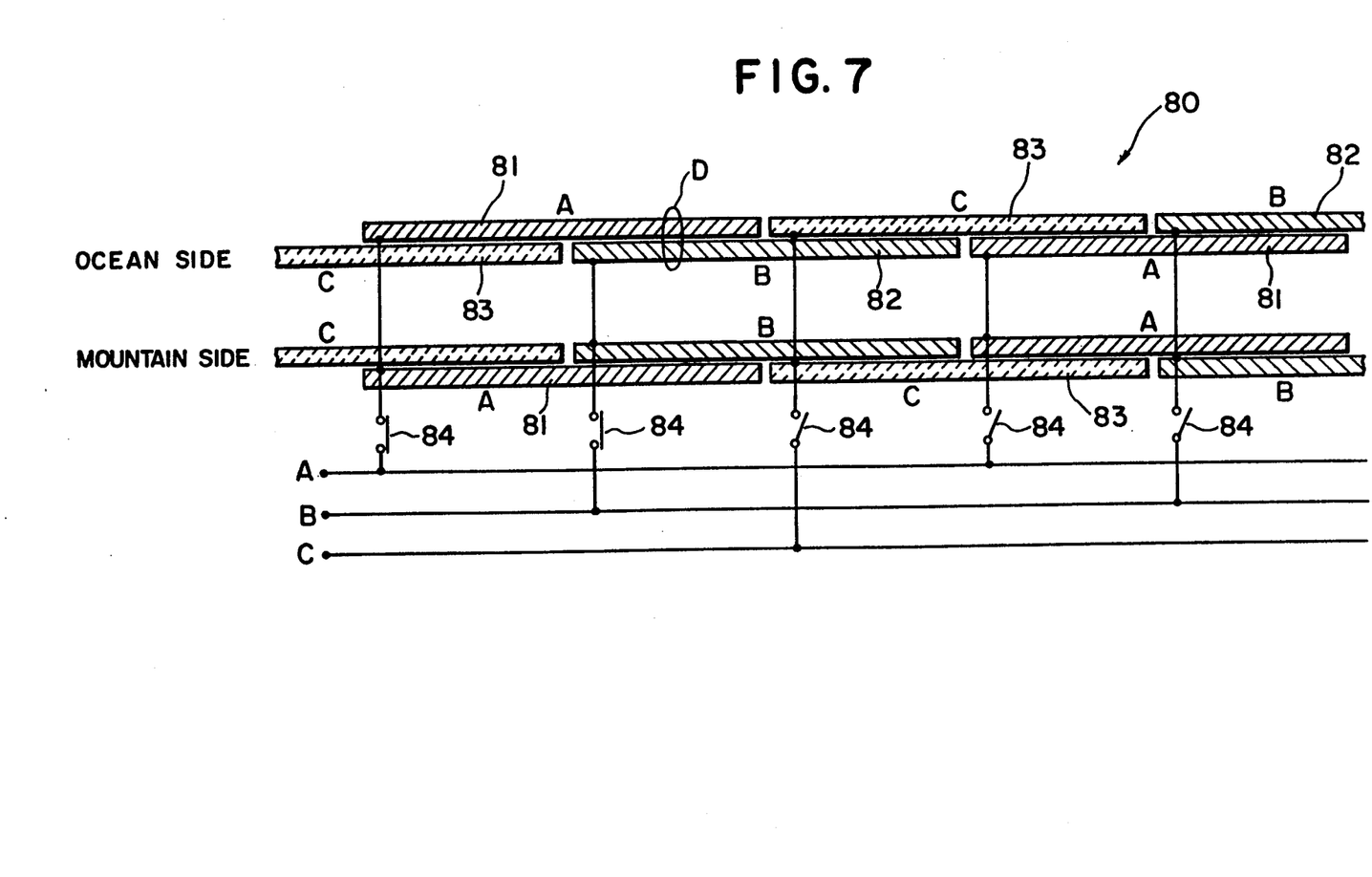
FIG. 7 is a diagram showing a multiple-line feeder system of a superconductive magnetically levitated railway illustrating the embodiment of the present invention.
Figure 8:
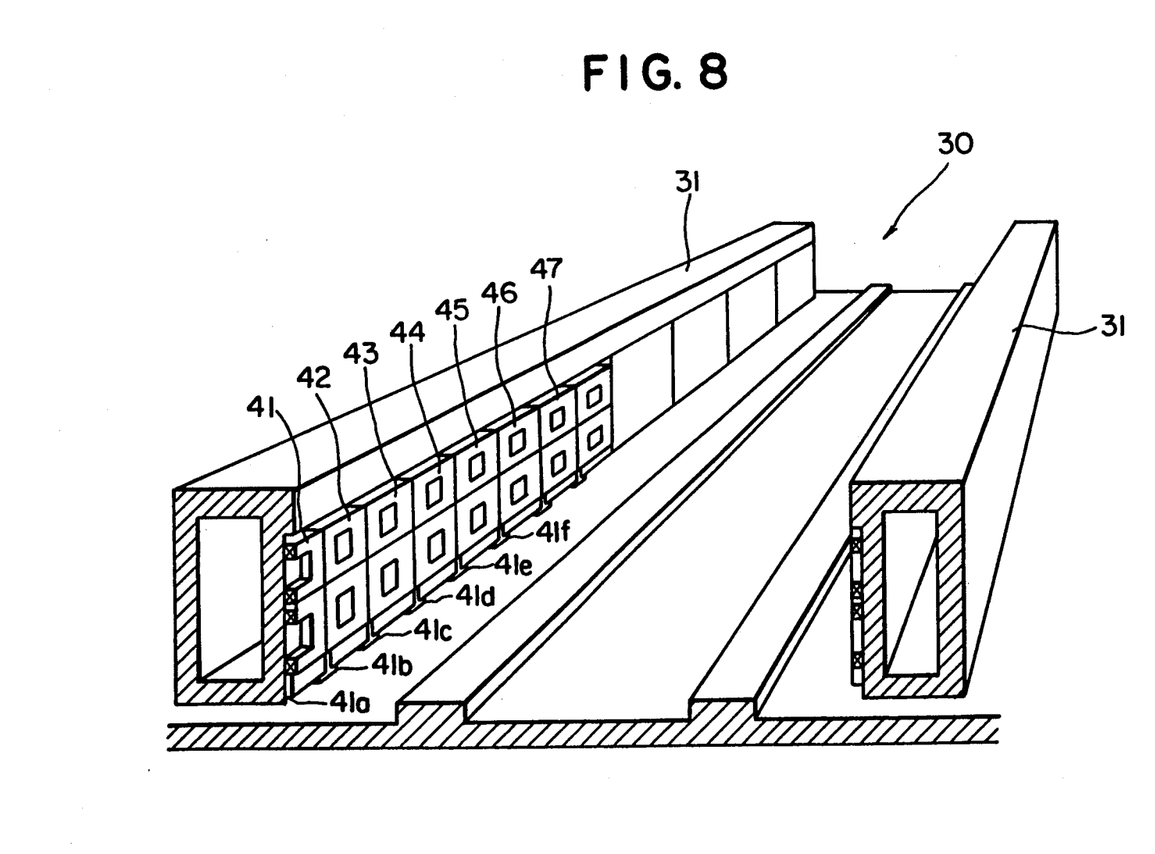
FIG. 8 is a perspective view showing the laid state of ground coils of a superconductive magnetically levitated railway illustrating the embodiment of the present invention.
Figure 9:
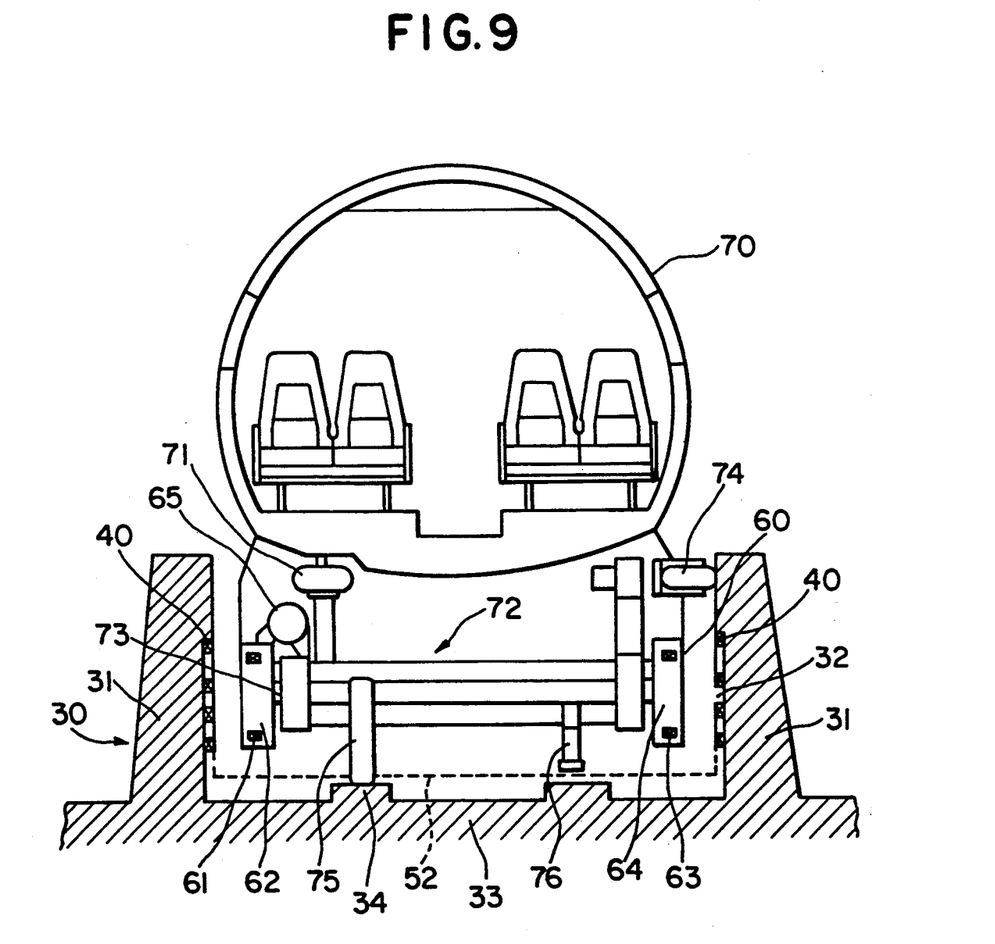
FIG. 9 is a schematic sectional view showing the overall construction of a superconductive magnetically levitated railway illustrating the embodiment of the present invention.

FIG. 5 is a diagram showing the arrangement of ground coils and superconducting magnets of a superconductive magnetically levitated railway illustrating an embodiment of the present invention, FIG. 6 is a circuit diagram showing the arrangement of ground coils of a superconductive magnetically levitated railway illustrating the embodiment of the present invention, FIG. 7 is a diagram showing a multiple-line feeder system of a superconductive magnetically levitated railway illustrating the embodiment of the present invention, FIG. 8 is a perspective view showing the laid state of ground coils of a superconductive magnetically levitated railway illustrating the embodiment of the present invention, and FIG. 9 is a schematic sectional view showing the overall construction of a superconductive magnetically levitated railway illustrating the embodiment of the present invention.

As shown in the aforementioned drawings, numeral 30 denotes a track having side walls 31 on the inner side of each of which a recess 32 is formed. A track bed 33 has raised travel paths 34 along which wheels are adapted to run. Ground coils 40 which perform the three functions of propulsion, levitation and guidance include a U-phase coil 41, a negative W-phase coil 42, a V-phase coil 43, a negative U-phase coil 44, a W-phase coil 45 and a negative V-phase coil 46 arranged at a 60° pitch, in the order mentioned, within the recess 32 formed in the inner side of each side wall 31. An N pole 61 and a S pole 62 of each of a pair of superconducting magnets 60 correspond to the these six phase of the propulsion-levitation-guidance ground coils 40. Numerals 41a ~ 41f denote lead wires, one for the coil of each phase. The arrangement of the propulsion-levitation-guidance ground coils in FIG. 5 illustrates the arrangement of portion D in FIG. 7.

The propulsion-levitation-guidance ground coils 40 consist of an insulative resin and are mounted in the recess 32 formed in the inner side of each side wall 31. More specifically, a side-wall levitation system is adopted in which upper and lower propulsion-levitation-guidance ground coil segments for producing propulsive, levitating and guiding forces are connected together into a figure-eight configuration and mounted in the side walls. Further, the figure-eight connected propulsion-levitation-guidance ground coils in the opposing side walls are interconnected by feeders 51, which are supplied with current from power supplies 50, 55 (see FIG. 5) (a power supply 50' for only one phase is illustrated in FIG. 6), and null-flux lines 52 (see FIG. 5) serving also as feeders.

In the side-wall levitation system, the power supplies 50, 55 are connected to the opposing ground coils 40 via the feeders 51 and the null-flux lines 52 serving also as the feeders. Currents in the same direction flow into the upper and lower coil segments of each ground coil so that propulsive forces are generated by the vertical sides of the coils. When the vehicle is running at low velocity via auxiliary wheels, the linkage flux of the opposing ground coils is zero, the current is zero and the electromagnetic resistance to traveling is zero. When the vehicle is running while levitated, a difference is produced in the flux linking the upper and lower coil segments and an electric current is induced to produce a levitating force which attempts to return the superconducting magnets in the upward direction. As a result, the vehicle is stabilized at a position where the levitating force balances the weight of the vehicle. If the vehicle is displaced laterally, a difference develops in the linkage flux between the upper coil segments of the opposing coils and in the linkage flux between the lower coils segment of the opposing coils. As a consequence, a current is induced and a guiding force that returns the superconducting magnets to the middle of the track is produced.

This side-wall levitation system has already been proposed by the inventors of this application in the specification of Japanese Patent Application Laid-Open No. 1-298902 (U.S. Pat. No. 4,913,059).

When the vehicle is at a certain position, the U-phase coil 41, the negative W-phase coil 42 and the V-phase coil 43 oppose the N pole 61 of superconducting magnet 60, and the negative U-phase coil 44, the W-phase coil 45 and the negative V-phase coil 46 oppose the S pole 62 of superconducting magnet 60. Accordingly, third harmonics of the magnetic field produced by the propulsion-levitation-guidance ground coils in the induced voltage developed by each phase can be effectively reduced, and it is possible to reduce the heat loss generated by the superconducting magnets.

In the above-described propulsion-levitation-guidance ground coils, as shown in FIG. 7, three sections 81, 82, 83 connected to triple feeders A, B, C are fed through section changeover switches 84.

A triple feeder system having three feeder systems is thus applied as the feeder system. More specifically, the vehicle is constantly fed from two systems (A and B, C and B or C and A; in FIG. 5, the two systems are represented by I and II), whereby the vehicle is driven. The vehicle is fed from all three systems (A, B and C) only when there is a transition from one section to another. According to this system, the installed capacity of power converting equipment can be made three-fourths of that in the arrangement which relies upon dual feeders. In addition, the vehicle can be driven using two of the systems if one should fail. In such case, the maximum propulsion will be halved during this interval of time, but the vehicle, such as a train, can continue to be run without the entire line coming to a stop.

In so-called car-system triple feed in which a coil array corresponding to car length is fed in sections, as proposed in the prior art, a train having different car lengths and a different car pitch in the longitudinal direction is difficult to run when one system fails and the vehicle is driven using the remaining two systems. However, in accordance with the triple feeder system of this invention, the N, S poles of the pair of superconducting magnets are fed from two systems. As a consequence, a train having different car lengths can be run without impediment, without encountering the above-described limitation.

A specific arrangement of the ground coils in the superconductive magnetically levitated railway of the invention will now be described with reference to FIGS. 8 and 9.

As shown in FIGS. 8 and 9, only the propulsion-levitation-guidance ground coils 40 consisting of synthetic resin, for example, are arranged in the recess 32 in each of the side walls 31 of track 30. More specifically, the U-phase coil 41, the negative W-phase coil 42, the V-phase coil 43, the negative U-phase coil 44, the W-phase coil 45 and the negative V-phase coil 46 are arranged at a 60° pitch, in the order mentioned, within the recess 32. The phase coils are connected to each section, fed from the feeders, via the lead wires 41a, 41b, 41c, 41d, 41e and 41f.

The ground coils on the mountain side and the ground coils on the ocean side are connected by the null-flux lines 52 serving also as feeders, as shown in FIGS. 5 and 9.

The N pole 61 and the S pole 62 of the pair of superconducting magnets oppose the ground coils thus arranged, and the vehicle is propelled, levitated and guided by the six phases of the propulsion-levitation-guidance ground coils 40.

As illustrated in FIG. 9, the vehicle includes a car body 70, a car 72 arranged below the car body 70 via pneumatic springs 71, and a car frame 73 on which is mounted a superconducting magnet 60 having a superconducting coil 63, a cryostat 64 and a helium tank 65, etc. Also provided on the frame are an auxiliary guiding device 74, an auxiliary supporting device 75 and an emergency landing device 76.

As mentioned above, a propulsive force is produced by the vertical sides of the upper and lower coil segments of the ground coils 40. In a case where a sufficient amount of this propulsive force is not obtained, special-purpose propulsion ground coils for providing solely a propulsive force can be installed separately of the levitating and guiding ground coils. In such case, it goes without saying that the special-purpose propulsion ground coils would be arranged in six phases, in the manner described above, and a pair of superconducting magnets mounted on the vehicle would be arranged to correspond to these six phases.

It should be noted that the present invention is not limited to the foregoing embodiment but can be modified in various ways on the basis of the gist of the invention without departing from the scope of the claims.

Thus, in accordance with the present invention as described above, higher harmonics of the magnetic field generated by the ground coils for propulsion are decreased, and the number of ground coil layers can be reduced. As a result, the influence of higher harmonics of the magnetic field upon the superconducting magnets mounted on the vehicle can be eliminated and smooth propulsion of the vehicle can be achieved. Furthermore, the ground coils are simplified to a single layer, thereby reducing thickness and greatly facilitating installation and maintenance.

Owing to the triple feeder system, the vehicle is capable of being driven using two systems if one system should fail. As a result, a vehicle such as a train can continue to be run without the entire line coming to a stop. By virtue of the triple feeder system according to the present invention, a train having different car lengths is capable of running without limitation, and a highly reliable operating system can be constructed.

What we claim is:

1. A superconductive magnetically levitated railway having a vehicle and a track, which has two side walls, along which the vehicle runs, comprising:
   (a) six phases of propulsion-levitation-guidance ground coils provided on both side walls of the track; and
   (b) a pair of superconducting magnets, which are mounted on the vehicle, corresponding to the six phases of said propulsion-levitation-guidance ground coils.

2. The railway according to claim 1, wherein said propulsion-levitation-guidance ground coils are a U-phase coil, a negative W-phase coil, a V-phase coil, a negative U-phase coil, a W-phase coil and a negative V-phase coil arranged successively at a 60° pitch along both side walls of the track.

3. A power-feed system for a superconductive magnetically levitated railway having a vehicle and a track, which has two side walls, along which the vehicle runs, said power-feed system comprising:
   (a) six phases of propulsion-levitation-guidance ground coils provided on both side walls of the track;
   (b) a pair of superconducting magnets, which are mounted on the vehicle, corresponding to the six phases of said propulsion-levitation-guidance ground coils; and
   (c) a triple feeder supplying said propulsion-levitation-guidance ground coils.

4. The system according to claim 3, wherein said triple feeder has a power supply system divided into three systems, in which the vehicle is driven by feeding current from two of said three systems in succession to coil sections partitioned to a suitable length, and is driven by feeding current from the remaining system as well only when there is a transition from one coil section to another.

5. The system according to claim 4, wherein current is fed from one of said three systems to U-, V- and W-phases of said propulsion-levitation-guidance ground coils along one side wall of the track, current is fed from another system to negative U-, V- and W-phases of said propulsion-levitation-guidance ground coils along the other side wall of the track, and when there is a transition from one coil section to another, current is fed successively from a third system to the U-, V- and W-phases or the negative U-, V- and W-phases of said propulsion-levitation-guidance ground coils along both side walls of the track.

* * * * *